UNITED STATES PATENT OFFICE 2,159,226

ELECTRIC STORAGE BATTERY PLATE AND A METHOD OF TREATING SUCH PLATE

Albert R. Reid, Niagara Falls, N. Y., assignor to U S L Battery Corporation, Niagara Falls, N. Y., a corporation of New York No Drawing. Application January 31, 1935, Serial No. 4,351

16 Claims. (Cl. 136—78)

This invention relates to electric storage battery plates and a method of treating such plates.

Heretofore, in the usual process of making battery plates, plate grids are filled with the active material comprising principally lead oxide in the form of a soft paste, and then treated in a pickling bath such as a weak solution of sulphuric acid, ammonium sulphate or the like, to harden the active material by forming lead sulphate. The pickled plates are then placed in forming or developing tanks and the oxide in the paste of the positive plate is changed to lead peroxide and in the negative plate to sponge lead by electrolytic action.

The present invention is a method of treating battery plates, before they are formed, with a persulphate either as a pickling step or by incorporating the persulphate in the paste; and has as its objects the proper conditioning of the plates for further treatment, the reducing of the time and current necessary for forming the plates, and the improving of the mechanical strength and life of the finished plates.

When freshly pasted battery plates are immersed in a pickling solution containing a persulphate, the new and useful results defined as objects of the invention are obtained, and it is believed that these results are due to the conversion of part of the lead oxide on the surface of the plate to lead peroxide and part of the lead oxide to lead sulphate. The action of the pickling solution is the same, therefore, as an electrolytic action in converting lead oxide to lead peroxide, but the action of the solution is primarily effective on the surface of the pasted plate in contradistinction to the electrochemical formation where the surface of the plate is last to be converted to lead peroxide. Due to the difficulty in electrochemically converting the oxides on the surface of the plates, and the lesser amount of lead oxide to be converted to lead peroxide after treatment with persulphate, the time and current required for forming by electrolytic action, is materially reduced, and the overcharging ordinarily necessary in the forming phase is substantially diminished. Further, litharge together with either lead suboxide, powdered lead, or lead sulphate may be used, or a mixture of all of them, and without the use of any red lead necessary in the usual practice to accelerate formation.

The formation of desirable lead sulphates in the plates treated in accordance with the present invention produces a setting action giving the plates greater mechanical strength and permitting either complete or partial drying without danger of cracking. The plates are then in a sufficiently hardened condition to facilitate handling or further treatment such as forming without damaging the plates. It has also been found that the general structure of the plate is improved so that a battery made of such plates has a longer service life showing that the plates are better able to stand the strain of charging and discharging.

As a specific example of the immersion phase of the method for treating battery plates in accordance with the present invention, very appreciable results may be obtained by immersing freshly pasted battery plates in a pickling bath comprising a dilute solution of sulphuric acid containing ammonium persulphate to the extent of 2% of the whole bath. The chemical change of the lead oxide to lead peroxide and lead sulphate may be indicated as follows:

$$3PbO + (NH_4)_2S_2O_8 + 4H_2O =$$
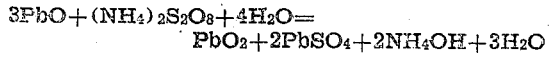
$$PbO_2 + 2PbSO_4 + 2NH_4OH + 3H_2O$$

Thus it is apparent that for every gram molecule of ammonium persulphate $(NH_4)_2S_2O_8$ used, one gram molecule of lead peroxide, $PbO_2$, and two gram molecules of lead sulphate, $PbSO_4$, are produced. It has been found that the strength of the solution is not critical and that the ammonium persulphate may be present in quantities ranging from 1% up to a saturated solution depending upon the depth of the reaction desired upon the surface of the plate, and the time of treatment. The more concentrated the solution the greater is the depth of the reaction and a decrease in the time required; and the time required for treatment may vary from several minutes to 72 hours, depending upon these factors and the results desired. Further, the bath need not be an acid solution but the persulphate may be added to any desired pickling solution such as the neutral pickling solutions, ammonium sulphate or sodium sulphate, or the persulphate may even be used as an aqueous solution and accomplish the desired results although less effectively.

Although ammonium persulphate has been recited in the specific example above, it has been found that persulphuric acid and sodium persulphate would produce the same desirable results, and it is to be understood that the term "persulphate" as used in the claims is intended to include these other persulphates, or any other persulphate, as it is believed that all persulphates will constitute equivalent materials, even though they may have other undesirable reactions due to other included materials.

As another phase of the present invention, the persulphate may be incorporated in the plate itself as an ingredient of the paste instead of the plates being dipped in a solution containing the persulphate, or the persulphate may be incorporated in the paste and the pasted plate immersed in a solution containing persulphate. When ammonium persulphate is used, it may be added in solid form to the lead oxide in the preparation of the paste, or it may be added as an aqueous solution of any strength up to a saturated solution. It may also be added with a dilute sulphuric acid solution or with a neutral sulphate solution such as ammonium sulphate.

The term paste, as used herein, refers to the active material of the plate either before or after its incorporation into the grid, but it is used to indicate the active material only before the formation of the plate.

Although the method of the present invention has been described with respect to the conversion of lead oxide to lead peroxide on the positive plates, the method may also be used to advantage with the negative plates, and it will now be apparent to those skilled in the art, that the invention is not limited to any particular persulphate, percentage of pursulphate used, or time factor, but instead, includes all phases of treating battery plates to chemically convert lead oxide to lead peroxide on the surface of the plates prior to the forming operation. Further, it will be apparent that the treatment of battery plates in accordance with the present invenion may be used with both the Plante and Faure types of plates.

What is claimd is:

1. The method of treating lead-acid type battery plates prior to any electrolytic forming action which comprises subjecting the plates to the action of a persulphate.

2. In a method of making lead-acid type storage battery plates, the step of immersing the plates in a solution containing a persulphate prior to any electrolytic forming of the plate.

3. A method of pickling lead-acid type storage battery plates which comprises immersing the plates in a bath containing dilute sulphuric acid and a persulphate.

4. A method of pickling lead-acid type storage battery plates prior to any electrolytic forming treatment which comprises the immersing of the plates in a bath containing a neutral sulphate and a persulphate.

5. A method of treating freshly pasted plates for lead-acid type storage batteries prior to forming which comprises immersing the plates in a bath containing ammonium persulphate of any concentration up to a saturated solution.

6. An unformed paste for battery plates comprising lead oxide and a persulphate.

7. An unformed paste for battery plates comprising lead oxide, dilute sulphuric acid, and a persulphate.

8. An unformed paste for battery plates comprising lead oxide, a neutral sulphate, and a persulphate.

9. An unformed paste for battery plates comprising lead oxide and ammonium persulphate.

10. The method of treating lead-acid type battery plates prior to forming which comprises incorporating a persulphate in the plate material and then immersing the plates in a bath containing a persulphate.

11. The method of treating freshly pasted battery plates to convert lead oxide to lead peroxide and lead sulphate which comprises first subjecting the plates to the action of persulphate and then subjecting the plates to an electrolytic forming treatment.

12. The method of making battery plates from a paste containing lead oxide which comprises incorporating a persulphate in the lead oxide paste to convert some of the lead oxide to lead peroxide and lead sulphate, and then forming the plates by an electrolytic action to convert the remainder of the lead oxide to lead peroxide.

13. The method of making battery plates from a paste containing lead oxide which comprises applying the paste to a plate grid, immersing the pasted grid in a pickling bath containing a persulphate for converting the lead oxide on the surface of the plate to lead peroxide and lead sulphate, and then converting the lead oxide within the plate to lead peroxide by an electrochemical forming action.

14. The method of making plate for storage batteries from a lead oxide paste which comprises incorporating a persulphate in the paste, applying the paste to a plate grid, immersing the plates in a pickling solution containing a persulphate, and then subjecting the plates to an electrochemical forming action.

15. Method of manufacturing a storage battery plate which consists in filling a plate grid with a paste containing plumbic substances, immersing the filled grid into a solution of persulphuric acid, and then forming the plate.

16. Method of manufacturing a storage battery plate, which consists in filling a plate grid with a paste containing plumbic substances, immersing the filled grid into a solution of a persulphate, and then forming the plate.

ALBERT R. REID.